US008928465B2

(12) United States Patent
Frye et al.

(10) Patent No.: US 8,928,465 B2
(45) Date of Patent: Jan. 6, 2015

(54) AFTERMARKET MODULE ARRANGEMENT AND METHOD FOR COMMUNICATING OVER A VEHICLE BUS

(75) Inventors: Mark S. Frye, Grosse Pointe Woods, MI (US); Charles A. Everhart, Canton, MI (US); Lawrence D. Cepuran, Northville, MI (US); Steven Swanson, Commerce Township, MI (US)

(73) Assignee: GM Motors LLC, Detroit, MI (US)

( * ) Notice: Subject to any disclaimer, the term of this patent is extended or adjusted under 35 U.S.C. 154(b) by 185 days.

(21) Appl. No.: 13/483,728

(22) Filed: May 30, 2012

(65) Prior Publication Data

US 2013/0321134 A1     Dec. 5, 2013

(51) Int. Cl.
    *G05B 11/01*    (2006.01)

(52) U.S. Cl.
    USPC .............. 340/12.32; 340/12.33; 340/12.39; 340/12.4; 340/870.01; 701/1; 701/22; 701/29.3; 701/31.4; 701/33.2; 701/34.3; 701/34.4; 701/36; 701/48

(58) Field of Classification Search
    USPC .......... 340/12.32, 12.33, 12.39, 12.4, 870.01; 701/1, 22, 29.3, 31.4, 33.2, 34.4, 36, 701/48, 4.3, 483
    See application file for complete search history.

(56) References Cited

U.S. PATENT DOCUMENTS

| 4,602,127 | A | * | 7/1986 | Neely et al. | 379/68 |
| 4,694,408 | A | * | 9/1987 | Zaleski | 701/36 |
| 4,757,463 | A | * | 7/1988 | Ballou et al. | 701/33.6 |
| 4,796,206 | A | * | 1/1989 | Boscove et al. | 701/99 |
| 4,831,560 | A | * | 5/1989 | Zaleski | 701/36 |
| 5,541,840 | A | * | 7/1996 | Gurne et al. | 701/29.3 |
| 5,555,498 | A | * | 9/1996 | Berra et al. | 701/34.3 |
| 5,780,782 | A | * | 7/1998 | O'Dea | 177/136 |
| 6,181,992 | B1 | * | 1/2001 | Gurne et al. | 701/31.4 |
| 7,575,080 | B2 | * | 8/2009 | Fernandez | 180/65.8 |
| 7,621,361 | B1 | * | 11/2009 | Fernandez | 180/65.8 |
| 7,737,831 | B2 | * | 6/2010 | Munoz | 340/426.35 |
| 8,054,200 | B1 | * | 11/2011 | Nelson | 340/901 |
| 2002/0110146 | A1 | * | 8/2002 | Thayer et al. | 370/465 |
| 2003/0083079 | A1 | * | 5/2003 | Clark et al. | 455/466 |
| 2005/0167172 | A1 | * | 8/2005 | Fernandez | 180/65.8 |
| 2006/0170285 | A1 | * | 8/2006 | Morimitsu et al. | 307/3 |
| 2007/0051544 | A1 | * | 3/2007 | Fernandez | 180/65.8 |
| 2007/0142977 | A1 | * | 6/2007 | Munoz | 701/1 |
| 2007/0201540 | A1 | * | 8/2007 | Berkman | 375/219 |
| 2008/0269971 | A1 | * | 10/2008 | Fernandez | 701/22 |
| 2008/0303343 | A1 | * | 12/2008 | Yamashita et al. | 307/3 |
| 2009/0125193 | A1 | * | 5/2009 | Fernandez | 701/48 |
| 2009/0284391 | A1 | * | 11/2009 | Berkobin et al. | 340/870.01 |
| 2009/0312896 | A1 | * | 12/2009 | Fernandez | 701/22 |

(Continued)

*Primary Examiner* — George Bugg
*Assistant Examiner* — Paul Obiniyi
(74) *Attorney, Agent, or Firm* — Ingrassia Fisher & Lorenz, P.C.

(57) ABSTRACT

An aftermarket module arrangement for installation into a vehicle having a vehicle bus and an electric power source is disclosed herein. The arrangement includes, but is not limited to, a module configured to communicatively couple with the vehicle bus and to electrically couple with the electric power source via a first electric power line, and further configured to engage in power line communications over the first electric power line. The arrangement further includes an aftermarket module configured to electrically couple with the electric power source over a second electric power line and to engage in power line communications over the second electric power line. The aftermarket module is further configured to communicatively couple with the module via power line communications and to communicate over the vehicle bus through the module.

20 Claims, 4 Drawing Sheets

(56) References Cited

U.S. PATENT DOCUMENTS

| | | | |
|---|---|---|---|
| 2010/0000810 A1* | 1/2010 | Fernandez | 180/65.31 |
| 2010/0271172 A1* | 10/2010 | Takikita | 340/5.8 |
| 2012/0007441 A1* | 1/2012 | John | 307/104 |
| 2012/0089298 A1* | 4/2012 | Peariso et al. | 701/33.4 |
| 2012/0172087 A1* | 7/2012 | Varela et al. | 455/556.1 |
| 2012/0274456 A1* | 11/2012 | Patenaude et al. | 340/425.5 |
| 2013/0039511 A1* | 2/2013 | Riggs | 381/86 |

* cited by examiner

AFTERMARKET MODULE ARRANGEMENT AND METHOD FOR COMMUNICATING OVER A VEHICLE BUS

TECHNICAL FIELD

The technical field generally relates to a vehicle, and more particularly relates to an aftermarket module arrangement for installation into a vehicle having a vehicle bus and an electric power source and a method for communicating over a vehicle bus in a vehicle having an electric power source.

BACKGROUND

In modern vehicles, aftermarket modules are increasingly being utilized by vehicle operators/occupants to provide a variety of services. For example, aftermarket telematics units that are compatible for use with communication systems that are designed to provide a vehicle operator and/or vehicle occupant with a variety of telematics services are increasingly becoming available in the marketplace.

In some instances, it may be desirable for an aftermarket module to communicate over a vehicle's CAN bus (hereinafter, "vehicle bus") with other vehicle components and/or systems. In one known example, such communication with the vehicle bus is accomplished by providing a module (e.g., a dongle) that is capable of docking with the vehicle's assembly line datalink (hereinafter "ALDL") which is coupled with the vehicle bus. The aftermarket module may then be communicatively coupled with the module to permit the aftermarket module to use the module to communicate with the vehicle bus.

In known examples, the communicative coupling between the aftermarket module and the module may be accomplished via wireless communications or via a wired connection running between the aftermarket module and the module. While both of these solutions are acceptable, there is room for improvement.

Accordingly, it is desirable to provide an aftermarket module arrangement that provides an alternative mode of connectivity between the aftermarket module and the module. In addition, it is desirable to provide an aftermarket module that provides the reliable communicative coupling currently available in a wired arrangement while also providing the aesthetically pleasing appearance currently available in a wireless arrangement. Furthermore, other desirable features and characteristics of the present invention will become apparent from the subsequent detailed description and the appended claims, taken in conjunction with the accompanying drawings and the foregoing technical field and background.

SUMMARY

Various examples of an aftermarket module arrangement for installation into a vehicle having a vehicle bus and an electric power source and a method for communicating over a vehicle bus in a vehicle having an electric power source are disclosed herein.

In a first, non-limiting example, the aftermarket module arrangement includes, but is not limited to, a module that is configured to communicatively couple with the vehicle bus and to electrically couple with the electric power source via a first electric power line. The module is further configured to engage in power line communications over the first electric power line. The aftermarket module arrangement further includes, but is not limited to, an aftermarket module that is configured to electrically couple with the electric power source over a second electric power line and to engage in power line communications over the second electric power line. The aftermarket module is further configured to communicatively couple with the module via power line communications and to communicate over the vehicle bus through the module when the module is communicatively coupled with the vehicle bus and when the aftermarket module is communicatively coupled with the module.

In a second, non-limiting example, the arrangement includes, but is not limited to, a module that is configured to communicatively couple with the vehicle bus and to electrically couple with the electric power source via a first electric power line. The module is further configured to engage in power line communications over the first electric power line. The arrangement further includes, but is not limited to, an aftermarket module that is configured to electrically couple with the electric power source over a second electric power line and to engage in power line communications over the second electric power line. The arrangement still further includes, but is not limited to, a user input module that is configured to electrically couple with the electric power source over a third electric power line and to engage in power line communications over the third electric power line. The aftermarket module is further configured to communicatively couple with the module via power line communications and to communicate over the vehicle bus through the module when the module is communicatively coupled with the vehicle bus and when the aftermarket module is communicatively coupled with the module. The user input module is configured to communicate with the aftermarket module via power line communications when the user input module and the aftermarket module are each electrically coupled to the electric power source.

In a third, non-limiting example, a system is disclosed that includes, but that is not limited to, a telematics module that is coupled to a first vehicle power supply line. The telematics module includes a module interface for communicating over the first vehicle power supply line. The system further includes, but is not limited to, a bus interface that is coupled to a vehicle information bus and to a second vehicle power supply line for communicating with both the second vehicle power supply line and the vehicle information bus. The communication with the second vehicle power supply line is responsive to the communication with the vehicle information bus. The first and the second vehicle power supply lines are coupled. The telematics module communicates with the vehicle information bus through the vehicle power supply lines and the bus interface.

DESCRIPTION OF THE DRAWINGS

The embodiments will hereinafter be described in conjunction with the following drawing figures, wherein like numerals denote like elements, and wherein.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

An aftermarket module arrangement is disclosed and described herein that is configured for installation into a vehicle having a vehicle bus and an electric power source, such as a conventional 12 Volt car battery. The aftermarket module arrangement is further configured to facilitate communication between an aftermarket module, such as an aftermarket telematics unit, and another component of the vehicle over the vehicle bus. The aftermarket module arrangement does not rely on wireless communications to facilitate such communication. Nor does it rely on direct wired connectivity between the individual components of the arrangement. Rather, the aftermarket module arrangement of the present disclosure relies on power line communication between the individual components of the arrangement. This provides the added benefit of flexibility to position any desired sensor at any desirable location around the vehicle. By electrically connecting the sensor to the vehicle's battery, the sensors are communicatively coupled to other devices in the vehicle. Power line communication systems are known in the art and entail carrying data on a conductor that is also used for electric power transmission. In this manner, the need for wiring that is dedicated to transmitting communication signals between discreet components of the system can be eliminated. Power line communication systems operate by impressing and decoding a modulated carrier signal on the wiring system. Accordingly, each component of the aftermarket module arrangement of the present disclosure is configured to not only receive electric power from the electric power source, but also to communicate over the electric power lines that deliver such electric power from the electric power source. In this way, the number of wires required by the arrangement can be reduced, providing a more pleasing aesthetic appearance while still facilitating communication between the aftermarket module and the vehicle bus.

A greater understanding of the examples of the aftermarket module arrangement and the method of communicating with a vehicle bus disclosed herein may be obtained through a review of the illustrations accompanying this application together with a review of the detailed description that follows.

Figure 1:
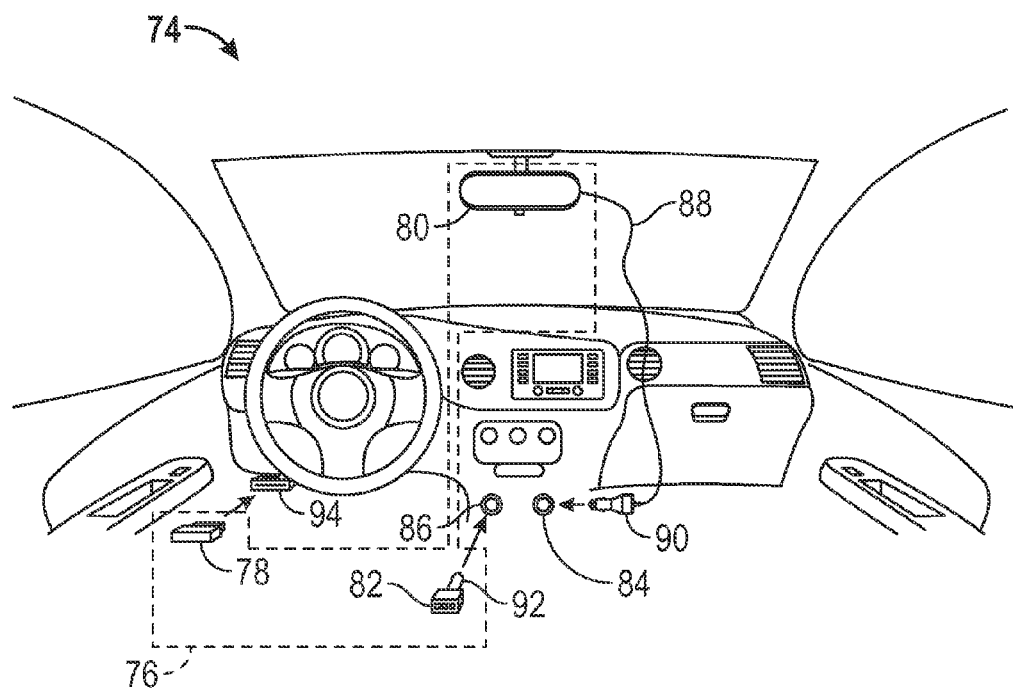
FIG. 1 is a perspective view of an interior of a vehicle fitted with a non-limiting example of an aftermarket module arrangement of the present disclosure.

With respect to FIG. 1, an interior of a vehicle 74 is illustrated in perspective view. Vehicle 74 includes a vehicle bus (see FIG. 5) and an electric power source (see FIG. 5) and an embodiment of an aftermarket module arrangement 76. Aftermarket module arrangement 76 includes a module 78, an aftermarket module 80, and a user input module 82. In some examples, module 78 may comprise a dongle.

Vehicle 74 includes a power outlet 84 and a power outlet 86 which provide electrical connectivity to the electric power source. In the illustrated example, aftermarket module 80 includes a wire 88 and a plug 90 configured to engage power outlet 84. When plug 90 engages power outlet 84, aftermarket module 80 is electrically connected to the electric power source. Similarly, user input module 82 includes a plug 92 configured to engage with power outlet 86. When plug 92 is engaged with power outlet 86, user input module 82 is electrically connected to the electric power source. Although aftermarket module 80 and user input module 82 are illustrated as being plugged into respective power outlets of vehicle 74, it should be understood that is depiction merely exemplary in nature and is not intended to be limiting. In other examples, aftermarket module 80 and user input module 82 may be connected to the electric power supply of vehicle 74 in any suitable and/or desirable manner. Furthermore, although aftermarket module 80 is depicted as being an aftermarket telematics unit in the form of a rear view mirror, it should be understood that the teachings herein are compatible with any type and variety of aftermarket module.

Vehicle 74 further includes an ALDL (see FIG. 6) and an ALDL access port 94 which provides communicative connectivity to the vehicle bus through the ALDL. ALDL access port 94 further provides electrical connectivity through the ALDL to the electric power source. In the illustrated example, module 78 is configured to engage ALDL access port 94. When module 78 engages ALDL access port 94, module 78 is thereby communicatively connected to the vehicle bus and electrically connected to the electric power source. Although the present discussion describes communication with the vehicle bus via the ALDL and an access port, it should be understood that other means of communicating with the vehicle bus may also be employed. For example, other accessories such as crash sensors, and the like, which may be communicatively coupled with the vehicle bus at any suitable location, can be used by the arrangement described herein to communicate with the vehicle bus. Accordingly, the present disclosure is not limited to use with the ALDL nor is it limited to use with dongles.

Figure 2:
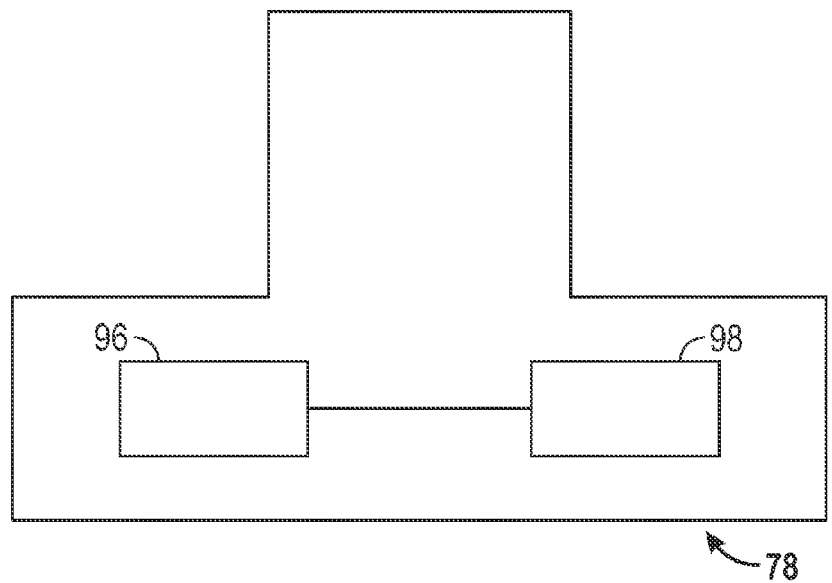
FIG. 2 is schematic view of a non-limiting example of a module configured for use with the aftermarket module arrangement of the present disclosure.

FIG. 2 provides a schematic illustration of module 78. Conventional modules, including, but not limited to dongles, may be configured to facilitate communication between an external component, such as an aftermarket module, and the vehicle bus. Some examples of conventional dongles include an ecoRoute™ HD, offered by Garmin under the part number 010-11380-00. In the illustrated example, module 78 includes a processor 96 and a power line communication device 98. Processor 96 may be any type of computer or microprocessor that is configured to perform algorithms, to execute software applications, to execute sub-routines and/or to be loaded with and to execute any other type of computer program. Processor 96 is configured to receive and transmit messages across the vehicle bus. In other examples, processor 96 may control an ALDL interface component to receive and transmit messages across the vehicle bus.

Power line communication device 98 may comprise any suitable device that is configured to engage in power line communication. In the illustrated example, power line communication device 98 comprises a power line modulator/demodulator. Power line communication device 98 is configured to impress a modulated carrier signal on the power transmission line that delivers electric power to module 78 from the electric power source for communication to other components, such as the aftermarket module, that are connected to the same electric power source. Power line communication device 98 is further configured to interpret a modulated carrier signal delivered to module 78 on the power transmission line that delivers electric power to module 78 from the electric power source. Processor 96 is communicatively coupled with power line communication device 98 and is configured to control power line communication device 98 to send and receive such modulated carrier signals over the power transmission line that delivers electric power to module 78 from the electric power source.

Figure 3:
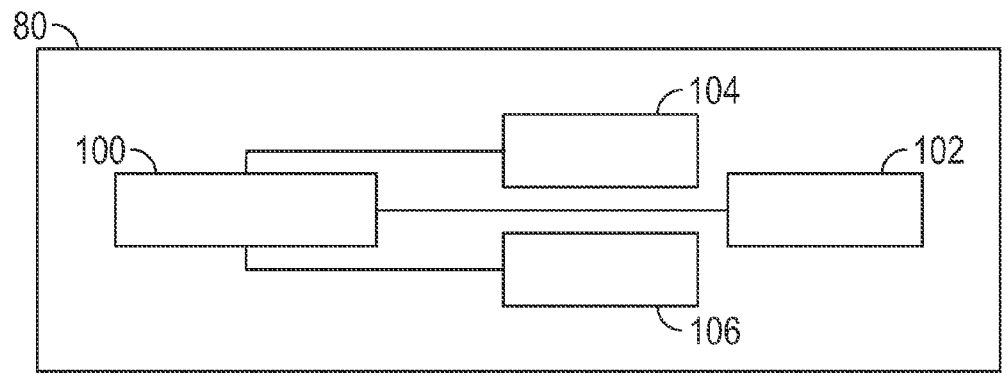
FIG. 3 is schematic view of a non-limiting example of an aftermarket module configured for use with the aftermarket module arrangement of the present disclosure.

FIG. 3 provides a schematic illustration of aftermarket module 80. In the illustrated example, aftermarket module 80 comprises an aftermarket telematics unit. In other embodiments of aftermarket module arrangement 76, aftermarket module may comprise any suitable aftermarket module configured to engage in communication with and/or over the vehicle bus. Conventional aftermarket telematics units are known and are disclosed in a pending U.S. patent application having the Ser. No. 12/787,472 filed on May 26, 2010, and also in U.S. Publication No. 2005/0273211 published on Dec. 8, 2005, each of which is hereby incorporated herein by reference in its entirety.

In the illustrated example, aftermarket module 80 includes a processor 100 and a power line communication device 102. Power line communication device 102 may comprise any suitable device configured to engage in power line communication. In the illustrated example, power line communication device 102 comprises a modulator/demodulator. Processor 100 is communicatively coupled with power line communication device 102 and is configured to control power line communication device 102 to engage in power line communications across the power transmission lines that deliver electric power from the electric power source. In the illustrated example, aftermarket module 80 further includes an electronic storage device 104 that enables aftermarket module 80 to store electronic data and a cellular chipset 106 that enables aftermarket module 80 to engage in extravehicular communications.

Figure 4:
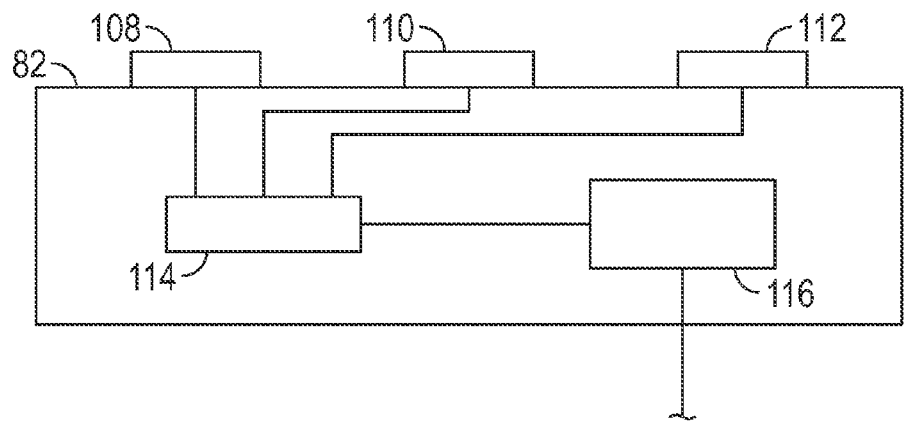
FIG. 4 is schematic view of a non-limiting example of a user input module configured for use with the aftermarket module arrangement of the present disclosure.

FIG. 4 provides a schematic illustration of user input module 82. With continuing reference to FIGS. 1-5, user input module 82 may be any component suitable to receive inputs from an operator of vehicle 74. For example, and without limitation, user input module may be a keyboard, a mouse, a touch screen, a tablet and stylus, a switch, a knob, a slide, a microphone, a camera, a motion detector, or any other device that is configured to permit a human to provide inputs into an electronic system. In the illustrated example, user input module 82 comprises a device having multiple buttons (108, 110, and 112) associated with various desired actions which may be undertaken by aftermarket module 80. User input module 82 further includes a processor 114 and a power line communication device 116. Power line communication device 116 may be any suitable device configured to engage in power line communications. In the illustrated example, power line communication device 116 comprises a power line modulator/demodulator. Processor 114 is communicatively coupled with power line communication device 116 and is configured to control power line communication device 116 to engage in power line communications.

Figure 5:
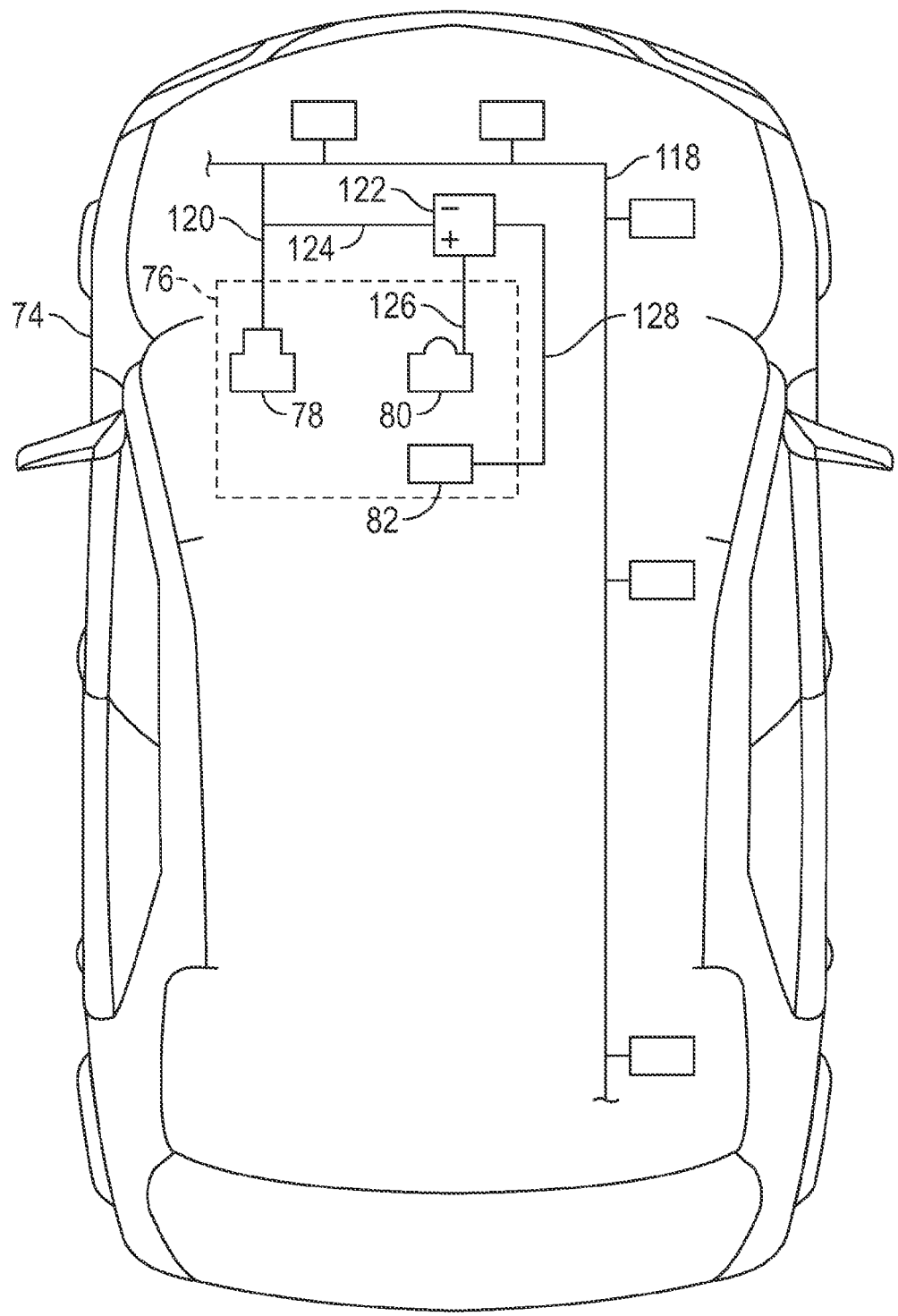
FIG. 5. is schematic view of the vehicle of FIG. 1 fitted with the non-limiting example of the aftermarket module arrangement of FIG. 1.

FIG. 5 provides a schematic view of vehicle 74 equipped with aftermarket module arrangement 76. Vehicle 74 includes a vehicle bus 118, an ALDL 120 communicatively coupled with vehicle bus 118, and an electric power source 122 in the form of a conventional car battery. The vehicle 74 further includes multiple components communicatively coupled to vehicle bus 118.

A wire 124 electrically connects electric power source 122 and ALDL 120. By electrifying ALDL, module 78 draws electric power from electric power source 122 through ALDL 120. In other examples, a wire 124 may connect electric power source 122 to vehicle bus 118 while in still other examples, wire 124 may directly connect electric power source 122 to module 78.

A wire 126 electrically connects electric power source 122 to aftermarket module 80. In some examples, wire 126 may lead to a power outlet of vehicle 74 and aftermarket module 80 may be configured to plug into that power outlet.

A wire 128 is electrically connects electric power source 122 and a user input module 82. In some examples, wire 128 may lead to a power outlet of vehicle 74 and user input module 82 may be configured to plug into that power outlet.

With all components of aftermarket module arrangement 76 electrically connected to electric power source 122, a wired route exists between each component of aftermarket module arrangement 76. As set forth above, each component of aftermarket module arrangement 76 is configured to engage in power line communications. Accordingly, each component of aftermarket module arrangement 76 may transmit and receive messages to and from one another over the wired connection formed by wires 124, 126, and 128.

In an example, a driver or other user may provide an input into user input module 82. User input module 82 will convert the user input into a message that is transmitted via wire 128 through electric power source 122 (or, in other examples, through some other juncture) and on through wire 126 to aftermarket module 80. On occasions when that user input entails a request for action that requires aftermarket module 80 to communicate with one or more of the components communicatively coupled with vehicle bus 118, aftermarket module 80 will transmit a message via wire 126, through electric power source 122, and on through wire 124 and ALDL 120 to module 78. Module 78 is configured to receive and interpret the message sent by aftermarket module 80, and in response, to generate a vehicle bus message and to transmit that vehicle bus message through ALDL 120 and across vehicle bus 118 to an appropriate vehicle component that is coupled with vehicle bus 118. A response by that vehicle component may be transmitted back to aftermarket module 80 along the same route in reverse sequence.

Figure 6:
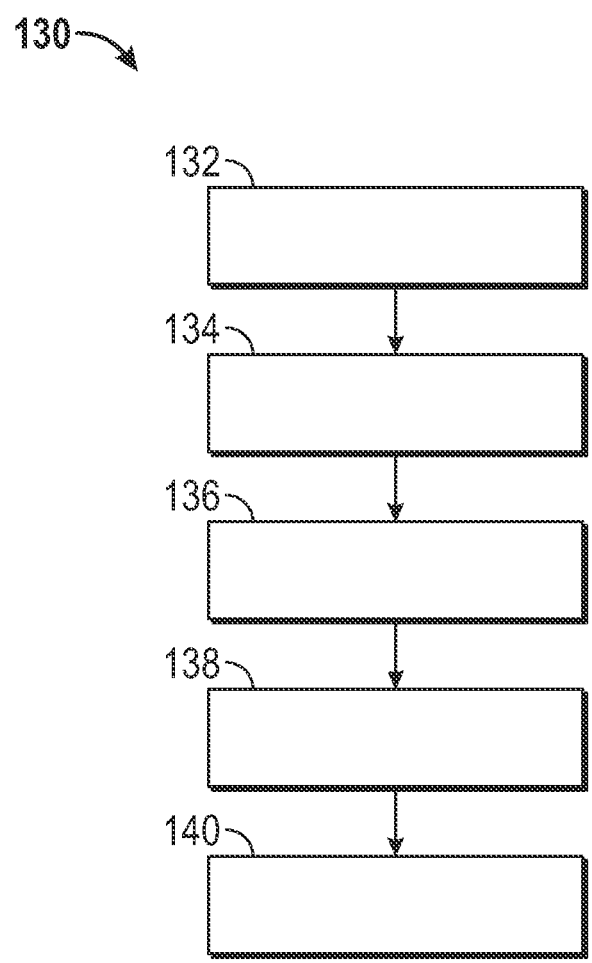
FIG. 6 is a block diagram illustrating a non-limiting example of a method of communicating over a vehicle bus using an aftermarket module arrangement.

FIG. 6 provides a block diagram of an example of a method 130 for communicating over a vehicle bus in a vehicle having an electric power source. At block 132 a module is communicatively coupled to the vehicle bus. The module is configured for power line communications.

At block 134, the module is electrically connected to the electric power source. In some examples, the communicative connection between the module and the vehicle bus may be electrified. In such examples, the steps performed at block 132 and 134 would collapse into a single step.

At block 136, and aftermarket module is electrically connected to the electric power source. The aftermarket module is configured to engage in power line communications.

At block 138 the aftermarket module is communicatively coupled with the module via power line communications.

At block 140, the aftermarket module communicates over the vehicle bus via power line communications routed through the module.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An aftermarket module arrangement for installation into a vehicle having a vehicle bus and an electric power source, the aftermarket module arrangement comprising:
a module configured to communicatively couple with the vehicle bus and to electrically couple with the electric power source via a first electric power line, the module further configured to engage in power line communications over the first electric power line; and
an aftermarket module configured to electrically couple with the electric power source over a second electric power line and to engage in power line communications over the second electric power line,
wherein the aftermarket module is further configured to communicatively couple with the module via power line communications and to communicate over the vehicle bus through the module when the module is communicatively coupled with the vehicle bus and when the aftermarket module is communicatively coupled with the module, and wherein the aftermarket module is powered by the electric power source without intervention by the module.

2. The aftermarket module arrangement of claim 1, wherein the module includes a microprocessor configured to control communications between the module and the vehicle bus.

3. The aftermarket module arrangement of claim 1, wherein the module includes a power line modulator/demodulator to facilitate power line communications of the module.

4. The aftermarket module arrangement of claim 3, wherein the module includes a microprocessor configured to control communications between the module and the vehicle bus and further configured to control the power line modulator/demodulator.

5. The aftermarket module arrangement of claim 1, wherein the aftermarket module includes a power line modulator/demodulator to facilitate power line communications of the aftermarket module.

6. The aftermarket module arrangement of claim 1, the vehicle including an assembly line data link (ALDL) having an access port and the ALDL being communicatively coupled with the vehicle bus and electrically coupled with the electric power source, wherein the module is configured to engage the access port, to communicatively couple with the vehicle bus through the access port, and to electrically couple with the electric power source through the access port.

7. The aftermarket module arrangement of claim 1, wherein the aftermarket module is configured to plug into a power outlet of the vehicle.

8. An aftermarket module arrangement for installation into a vehicle having a vehicle bus and an electric power source, the aftermarket module arrangement comprising:
a module configured to communicatively couple with the vehicle bus and to electrically couple with the electric power source via a first electric power line, the module further configured to engage in power line communications over the first electric power line;
an aftermarket module configured to electrically couple with the electric power source over a second electric power line and to engage in power line communications over the second electric power line; and
a user input module configured to electrically couple with the electric power source over a third electric power line and to engage in power line communications over the third electric power line,
wherein the aftermarket module is further configured to communicatively couple with the module via power line communications and to communicate over the vehicle bus through the module when the module is communicatively coupled with the vehicle bus and when the aftermarket module is communicatively coupled with the module,
wherein the user input module is configured to communicate with the aftermarket module via power line communications when the user input module and the aftermarket module are each electrically coupled to the electric power source, and
wherein the aftermarket module is powered by the electric power source without intervention by the module.

9. The aftermarket module arrangement of claim 8, wherein the user input module is configured to control the aftermarket module.

10. The aftermarket module arrangement of claim 8, wherein the user input module includes a power line modulator/demodulator to facilitate power line communications of the user input module.

11. The aftermarket module arrangement of claim 8, wherein the user input module is configured to plug into a power outlet of the vehicle.

12. The aftermarket module arrangement of claim 8, wherein the module includes a microprocessor configured to control communications between the module and the vehicle bus.

13. The aftermarket module arrangement of claim 8, wherein the module includes a power line modulator/demodulator to facilitate power line communications of the module.

14. The aftermarket module arrangement of claim 13, wherein the module includes a microprocessor configured to control communications between the module and the vehicle bus and further configured to control the power line modulator/demodulator.

15. The aftermarket module arrangement of claim 8, wherein the aftermarket module includes a power line modulator/demodulator to facilitate power line communications of the aftermarket module.

16. The aftermarket module arrangement of claim 8, the vehicle including an assembly line data link (ALDL) having an access port and the ALDL being communicatively coupled with the vehicle bus and electrically coupled with the electric power source, wherein the module is configured to engage the access port, to communicatively couple with the vehicle bus through the access port, and to electrically couple with the electric power source through the access port.

17. The aftermarket module arrangement of claim 8, wherein the aftermarket module is configured to plug into a power outlet of the vehicle.

18. A system comprising:
a telematics module coupled to a first vehicle power supply line and including a module interface for communicating over the first vehicle power supply line;
a bus interface coupled to a vehicle information bus and to a second vehicle power supply line for communicating with both the second vehicle power supply line and the vehicle information bus, wherein the communication with the second vehicle power supply line is responsive to the communication with the vehicle information bus, wherein the first and second vehicle power supply lines are coupled, wherein the telematics module communicates with the vehicle information bus through the vehicle power supply lines and the bus interface, and wherein the aftermarket module is powered by an electric power source without intervention by the module.

19. The system of claim 18, wherein the telematics module comprises a rear view mirror and wherein the module interface is contained within a housing of the rear view mirror.

20. The system of claim 18, wherein the communication with the vehicle information bus is responsive to the communication with the second vehicle power supply line.

* * * * *